US010632900B2

(12) United States Patent
Kurashige

(10) Patent No.: US 10,632,900 B2
(45) Date of Patent: *Apr. 28, 2020

(54) ILLUMINATION DEVICE AND VEHICLE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,832

(22) Filed: Aug. 16, 2019

(65) Prior Publication Data

US 2019/0375328 A1    Dec. 12, 2019

Related U.S. Application Data

(63) Continuation of application No. 16/199,527, filed on Nov. 26, 2018, now Pat. No. 10,457,194, which is a
(Continued)

(30) Foreign Application Priority Data

Nov. 7, 2014   (JP) ................................ 2014-227403

(51) Int. Cl.
*B60Q 1/14*         (2006.01)
*F21S 41/00*        (2018.01)
(Continued)

(52) U.S. Cl.
CPC ................ *B60Q 1/14* (2013.01); *B60Q 1/24* (2013.01); *F21S 41/00* (2018.01); *F21S 41/125* (2018.01);
(Continued)

(58) Field of Classification Search
CPC .... B60Q 1/14; B60Q 1/24; F21S 41/00; F21S 41/16; F21S 41/285; F21S 41/663; F21S 41/675; F21S 43/00
See application file for complete search history.

(56) References Cited

U.S. PATENT DOCUMENTS

2008/0247022 A1    10/2008    Yamauchi et al.
2009/0046474 A1    2/2009     Sato et al.
(Continued)

FOREIGN PATENT DOCUMENTS

CN          2194834 Y        4/1995
GB          2504330 A        1/2014
(Continued)

OTHER PUBLICATIONS

International Search Report and Written Opinion (Application No. PCT/JP2015/081371) dated Feb. 9, 2016.
(Continued)

*Primary Examiner* — Thomas M Sember
(74) *Attorney, Agent, or Firm* — Burr & Brown, PLLC

(57) ABSTRACT

Provided is an illumination device which has a coherent light source that emits a first coherent light beam and a second coherent light beam, an optical device that diffuses the first coherent light beam to illuminate a first illumination zone and diffuses a wave of the second coherent light beam to illuminate a second illumination zone, and a timing control unit that individually controls incidence timing of the first coherent light beam and the second coherent light beam on the optical device or illumination timing of the first illumination zone and the second illumination zone, wherein the optical device includes a first diffusion region on which the first coherent light beam is incident, and a second diffusion region on which the second coherent light beam is incident, the first diffusion region is capable of illuminating
(Continued)

the first illumination zone by diffusion of the incident first coherent light beam.

20 Claims, 12 Drawing Sheets

Related U.S. Application Data continuation of application No. 16/025,214, filed on Jul. 2, 2018, now Pat. No. 10,166,911, which is a continuation of application No. 15/522,941, filed as application No. PCT/JP2015/081371 on Nov. 6, 2015, now Pat. No. 10,023,105.

(51) Int. Cl.
| | |
|---|---|
| *F21S 43/00* | (2018.01) |
| *B60Q 1/24* | (2006.01) |
| *F21S 41/663* | (2018.01) |
| *F21S 41/675* | (2018.01) |
| *F21S 41/16* | (2018.01) |
| *F21S 41/20* | (2018.01) |
| *F21S 41/125* | (2018.01) |

(52) U.S. Cl.
CPC ............ *F21S 41/16* (2018.01); *F21S 41/285* (2018.01); *F21S 41/663* (2018.01); *F21S 41/675* (2018.01); *F21S 43/00* (2018.01)

(56) References Cited

U.S. PATENT DOCUMENTS

| | | |
|---|---|---|
| 2011/0249460 A1 | 10/2011 | Kushimoto |
| 2013/0169941 A1 | 7/2013 | Kurashige et al. |
| 2013/0170006 A1 | 7/2013 | Kurashige et al. |
| 2015/0137680 A1 | 5/2015 | Komatsu et al. |
| 2015/0370081 A1 | 12/2015 | Kurashige |

FOREIGN PATENT DOCUMENTS

| | | |
|---|---|---|
| JP | 2008-256824 A1 | 10/2008 |
| JP | 2009-048786 A1 | 3/2009 |
| JP | 2012-146621 A1 | 8/2012 |
| JP | 2013-222058 A1 | 10/2013 |
| WO | 2012/033170 A1 | 3/2012 |
| WO | 2012/033175 A1 | 3/2012 |
| WO | 2014/024385 A1 | 2/2014 |
| WO | 2014/119622 A1 | 8/2014 |

OTHER PUBLICATIONS

International Preliminary Report on Patentability (Application No. PCT/JP2015/081371) dated May 18, 2017.
Extended European Search Report (Application No. 15856415.3) dated Apr. 18, 2018.
Chinese Office Action (Application No. 201580060260.0) dated Dec. 28, 2015.
Extended European Search Report (Application No. 19184117.0) dated Oct. 14, 2019.

ILLUMINATION DEVICE AND VEHICLE

CROSS-REFERENCE TO RELATED APPLICATIONS

This application is a continuation of U.S. application Ser. No. 16/199,527, filed Nov. 26, 2018, which is a continuation of U.S. application Ser. No. 16/025,214, filed Jul. 2, 2018, now U.S. Pat. No. 10,166,911, issued Jan. 1, 2019, which is a continuation of U.S. application Ser. No. 15/522,941, filed Apr. 28, 2017, now U.S. Pat. No. 10,023,105, issued Jul. 17, 2018, which is the National Stage of International Application No. PCT/JP2015/081371, filed Nov. 6, 2015, the entireties of which are incorporated herein by reference.

FIELD OF THE INVENTION

The present invention relates to an illumination device and a vehicle that illuminate a predetermined illumination area using a coherent light beam.

BACKGROUND OF THE INVENTION

In recent years, there has been proposed a variable light distribution headlight that can automatically change the light distribution thereof according to the running status of a vehicle. A headlight obtained by combining an LED and a liquid crystal shutter is known as such a variable light distribution headlight. However, in the illumination device obtained by combining an LED and a liquid crystal shutter, the LED is a diffusion light source having a large area. Therefore, it is impossible to finely control the light distribution with a refraction/reflection optical system, and it is difficult to deliver a light beam over a long distance. Furthermore, since the LED has a lower emission intensity than the conventional lamp light source, it is necessary to arrange a large number of LEDs in order to obtain a large light quantity as a headlight. This arrangement is expensive and requires a large installation space. Also, with a configuration in which a large number of high-intensity LEDs are arranged, it is necessary to take some measures for heat dissipation.

Patent Literature 1 discloses a vehicle lamp including a light source that emits a coherent light beam, and a hologram device storing a hologram pattern. The hologram pattern has been calculated such that a diffracted light beam reproduced by irradiation with the coherent light beam forms a light distribution pattern for the vehicle lamp with a predetermined light intensity distribution.

CITATION LIST

Patent Literature

Patent Literature 1: JP 2012-146621 A

SUMMARY OF THE INVENTION

Technical Problem

In general, a laser light source that emits a coherent light beam has a higher emission intensity than an LED, and the light beam emitted from the laser light source is coherent. Advantageously, therefore, the laser light source can finely control the light distribution and deliver the light beam over a long distance. Meanwhile, there is a problem in that, when the coherent light beam strikes a scattering/reflecting surface such as a road surface, the coherent light beam reflected by each part of the scattering/reflecting surface interferes with one another and a speckle occurs. When a coherent light beam is used as a vehicle lamp as in Patent Literature 1, a speckle may occur in the field of view of a driver, leading to distraction for the driver.

In addition, in Patent Literature 1, the coherent light beam emitted from the light source is diffused over the entire area of a predetermined illumination zone at once. Therefore, it is impossible to finely control the light distribution in the predetermined illumination zone, for example, to illuminate (or not to illuminate) only a part of the predetermined illumination zone.

There may also be a request to illuminate an area outside the light distribution standard of a headlight, depending on the running status of a vehicle. A pedestrian or a traffic sign located outside the light distribution standard of the headlight can, if illuminated, attract driver's attention, thereby improving the safety of night driving.

Furthermore, it is desirable that an illumination mode in an illumination zone be changed as required in various illumination devices, not only in an illumination device for a vehicle.

The present invention has been made in view of the above issues. An object of the present invention is to provide an illumination device and a vehicle capable of changing an illumination mode in an illumination zone.

Solution to Problem

An illumination device according to an aspect of the present invention includes:

a coherent light source that emits a first coherent light beam and a second coherent light beam;

an optical device that diffuses the first coherent light beam to illuminate a first illumination zone and diffuses a wave of the second coherent light beam to illuminate a second illumination zone; and a timing control unit that individually controls incidence timing of the first coherent light beam and the second coherent light beam on the optical device or illumination timing of the first illumination zone and the second illumination zone, wherein the optical device includes a first diffusion region on which the first coherent light beam is incident, and a second diffusion region on which the second coherent light beam is incident, the first diffusion region is capable of illuminating the first illumination zone by diffusion of the incident first coherent light beam, the second diffusion region is capable of illuminating the second illumination zone that is at least partially different from the first illumination zone by diffusion of the incident second coherent light beam, the first diffusion region includes a plurality of first element diffusion regions, the first element diffusion regions illuminating respective first partial regions in the first illumination zone by diffusion of the incident first coherent light beam, the first partial regions being respectively illuminated by the first element diffusion regions at least partially different from one another, and the second diffusion region also includes a plurality of second element diffusion regions, the second element diffusion regions illuminating respective second partial regions in the second illumination zone by diffusion of the incident second coherent light beam, the second partial regions being respectively illuminated by the second element diffusion regions at least partially different from one another.

The first diffusion region may be capable of illuminating the first illumination zone conforming to a light distribution standard of a headlight by diffusion of the incident first coherent light beam, and the second diffusion region may be capable of illuminating the second illumination zone outside the light distribution standard by diffusion of the incident second coherent light beam.

The illumination device may further include a scanning unit that scans the optical device with the first coherent light beam and the second coherent light beam from the coherent light source.

The scanning unit may include a light scanning device that periodically changes traveling directions of the first coherent light beam and the second coherent light beam emitted from the coherent light source.

The timing control unit may control the incidence timing of the second coherent light beam on the optical device or the illumination timing of the second illumination zone in synchronization with timing of scan with the first coherent light beam and the second coherent light beam by the light scanning device, such that an illumination mode of the second illumination zone changes periodically or temporarily.

The first diffusion region and the second diffusion region may each have an elongated shape extending in a uniaxial direction and may be disposed adjacent to each other in a direction orthogonal to the uniaxial direction.

The illumination device may further include an object detection unit that detects an object existing in the second illumination zone, wherein the light emission timing control unit may control the incidence timing of the second coherent light beam on the optical device or the illumination timing of the second illumination zone so as to illuminate the object detected by the object detection unit.

The object detection unit may include:

an imaging device that images the inside of the second illumination zone; and an image processing unit that performs image processing on an imaging result of the imaging device to recognize the object in the second illumination zone.

The object detection unit may include:

a position information acquisition unit that acquires position information of a vehicle;

a storage unit that stores position information of an object; and an information processing unit that recognizes the object in the second illumination zone based on the position information of the vehicle acquired by the position information acquisition unit and the position information of the object stored in the storage unit.

The optical device may be a hologram recording medium, the first element diffusion regions of the first diffusion region may be element hologram areas in which different interference fringe patterns are formed, and the second element diffusion regions of the second diffusion region may also be element hologram areas in which different interference fringe patterns are formed.

The optical device may be a lens array group including a plurality of lens arrays, the first element diffusion regions of the first diffusion region may include lens arrays, and the second element diffusion regions of the second diffusion region may include lens arrays.

A vehicle according to an aspect of the present invention includes the illumination device.

Advantageous Effects of Invention

According to the present invention, it is possible to change an illumination mode in an illumination zone using a coherent light beam.

DETAILED DESCRIPTION OF THE INVENTION

Figure 1:
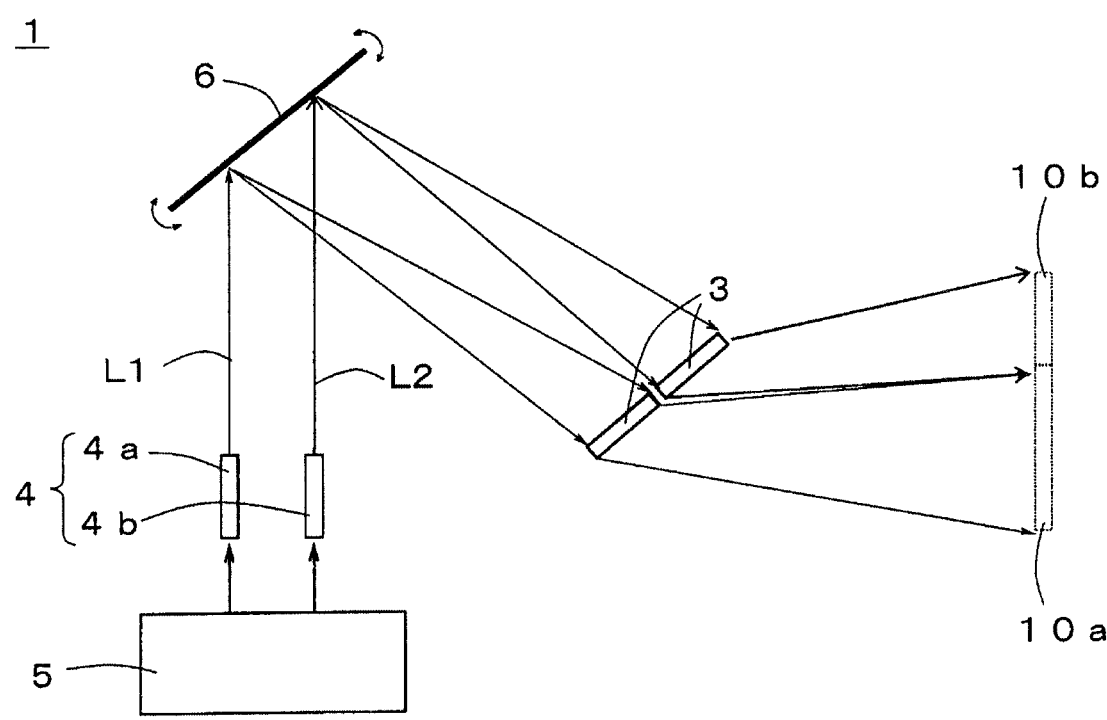
FIG. 1 is a diagram showing a schematic configuration of an illumination device according to a first embodiment of the present invention.

Hereinafter, embodiments of the present invention will be described in detail with reference to the accompanying drawings. Note that in the drawings attached hereto, for easy understanding of the illustration, the scales, the aspect ratios in the longitudinal and lateral directions, and the like have been appropriately changed and exaggerated from the actual ones.

As used in the present specification, for example, terms such as "parallel", "orthogonal", and "same", and values of length and angle, which specify the shape and geometric conditions and the degrees thereof, are not strictly restricted in meaning but can be interpreted to include a range that may expect similar functions.

FIG. 1 is a diagram showing a schematic configuration of an illumination device 1 according to a first embodiment of the present invention.

As shown in FIG. 1, the illumination device 1 according to the present embodiment includes an optical device 3, a coherent light source 4 that emits a first coherent light beam L1 and a second coherent light beam L2, a timing control unit 5, and a scanning unit 6.

The optical device 3 diffuses the first coherent light beam L1 from the coherent light source 4 to illuminate a first illumination zone 10a, and diffuses the second coherent light beam L2 from the coherent light source 4 to illuminate a second illumination zone 10b.

The timing control unit 5 individually controls the incidence timing of the first coherent light beam L1 and the second coherent light beam L2 on the optical device 3, or the illumination timing of the first illumination zone 10a and the second illumination zone 10b. The timing control unit 5 may control the emission timing of the coherent light source 4, the incidence timing of the first coherent light beam L1 and the second coherent light beam L2 incident on the optical device 3, or the illumination timing at which the first coherent light beam L1 and the second coherent light beam L2 diffused by the optical device 3 illuminate the first illumination zone 10a and the second illumination zone 10b respectively.

In order to control the emission timing of the coherent light source 4, for example, the timing of turning on/off the coherent light source 4 should be controlled. By controlling the emission timing of the coherent light source 4, it is possible to control the timing of incidence on the optical device 3 and to control the illumination timing of the first illumination zone 10a and the second illumination zone 10b.

In order to control the timing of incidence on the optical device 3 and the illumination timing of the first illumination zone 10a and the second illumination zone 10b without changing the emission timing of the coherent light source 4, for example, an optical shutter capable of selectively transmitting or blocking the first coherent light beam L1 and the second coherent light beam L2 should be provided. Alternatively, an optical path switching member capable of changing the optical paths of the first coherent light beam L1 and the second coherent light beam L2 may be provided.

In this manner, the timing control unit 5 controls the emission timing of the coherent light source 4 and the timing of switching of the optical shutter, the optical path switching member, and the like. As a result, the timing control unit 5 can control the timing of incidence on the optical device 3, and the illumination timing of the first illumination zone 10a and the second illumination zone 10b. An example in which the timing control unit 5 controls the emission timing of the coherent light source 4 will be mainly described below.

The coherent light source 4 includes a first light source unit 4a that emits the first coherent light beam L1 and a second light source unit 4b that emits the second coherent light beam L2. For example, a semiconductor laser light source may be used as the first light source unit 4a and the second light source unit 4b. The first light source unit 4a and the second light source unit 4b may be independently provided on separate substrates, or may be disposed side by side on a common substrate to constitute a light source module. In addition, a plurality of first light source units 4a and a plurality of second light source units 4b may be provided in order to increase the emission intensity. The emission wavelength range of the first coherent light beam L1 and the emission wavelength range of the second coherent light beam L2 may be the same or different from each other.

The timing control unit 5 individually controls the emission timing of the first light source unit 4a emitting the coherent light beam L1 and the emission timing of the second light source unit 4b emitting the coherent light beam L2.

Specifically, for example, the timing control unit 5 controls whether to cause the light source units 4a and 4b to emit the coherent light beams L1 and L2 respectively, that is, whether to turn on/off each of the light source units 4a and 4b.

In the present embodiment, the first illumination zone 10a is illuminated using the first coherent light beam L1 from the light source unit 4a, and the second illumination zone 10b is illuminated using the second coherent L2 from the light source unit 4b. As an example of a specific optical configuration for performing such illumination, as shown in FIG. 1, it is considered to provide the scanning unit 6 and the optical device. The scanning unit 6 changes the traveling directions of the first coherent light beam L1 and the second coherent light beam L2 from the light source units 4a and 4b. The optical device 3 diffuses the first coherent light beam L1 and the second coherent light beam L2 from the scanning unit 6 to illuminate the first illumination zone 10a and the second illumination zone 10b respectively.

Alternatively, the scanning unit 6 may be omitted, and the traveling directions of the first coherent light beam L1 and the second coherent light beam L2 may be changed at the light emitting units 4a and 4b, and then the first coherent light beam L1 and the second coherent light beam L2 may enter the optical device 3. Alternatively, the traveling directions of the first coherent light beam L1 and the second coherent light beam L2 diffused by the optical device 3 may be changed by an optical member separate from the scanning unit 6, so that the first illumination zone 10a and the second illumination zone 10b may be illuminated. Hereinafter, an example in which the scanning unit 6 is provided as shown in FIG. 1 will be mainly described.

The scanning unit 6 causes the first coherent light beam L1 and the second coherent light beam L2 from the coherent light source 4 to scan the optical device 3. The scanning unit 6 may cause the first coherent light beam L1 and the second coherent light beam L2 to scan the optical device 3 by moving the coherent light source 4, or may cause the first coherent light beam L1 and the second coherent light beam L2 to scan the optical device 3 by moving the optical device 3. Alternatively, the scanning unit 6 may cause the first coherent light beam L1 and the second coherent light beam L2 to scan the optical device 3 by providing a light scanning device 6a that changes the traveling direction of a laser light beam from the light source unit 7.

An example in which the scanning unit 6 includes the light scanning device 6a will be mainly described below. The timing control unit 5 controls the incidence timing of the first coherent light beam L1 and the second coherent light beam L2 on the optical device 3 or the illumination timing of the second illumination zone 10b in synchronization with the timing of scan with the first coherent light beam L1 and the second coherent light beam L2 by the light scanning device 6a, such that the illumination modes of the first illumination zone 10a and the second illumination zone 10b change periodically or temporarily.

The light scanning device 6a changes the traveling directions of the first coherent light beam L1 and the second coherent light beam L2 from the coherent light source 4 over time, such that the traveling directions of the first coherent light beam L1 and the second coherent light beam L2 are not constant. As a result, the first coherent light beam L1 and the second coherent light beam L2 emitted from the light scanning device 6a scan an incident surface 3s of the optical device 3.

Figure 2A:
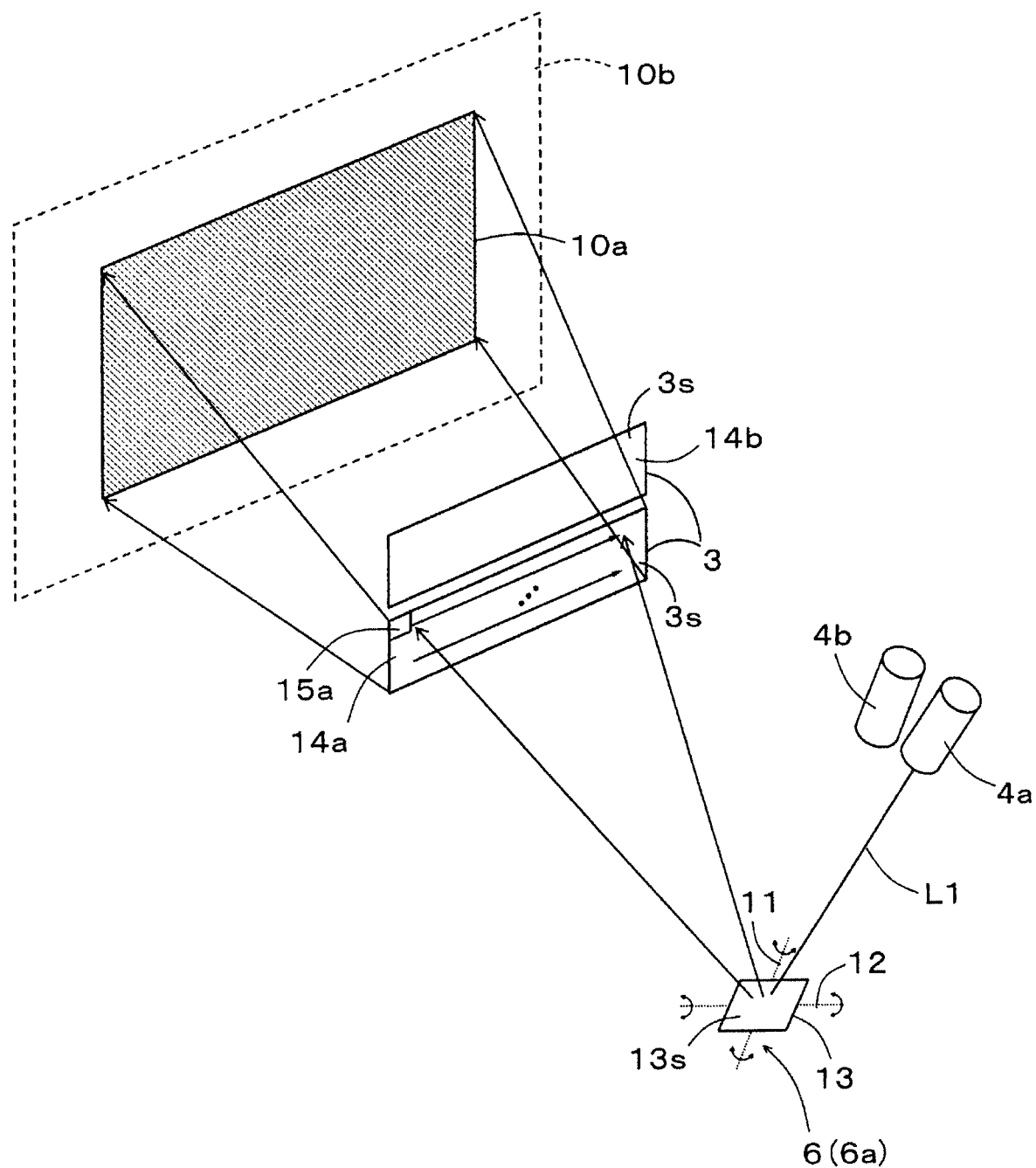
FIG. 2A is a view showing how an optical device is scanned with a first coherent light beam by a light scanning device.
Figure 2B:
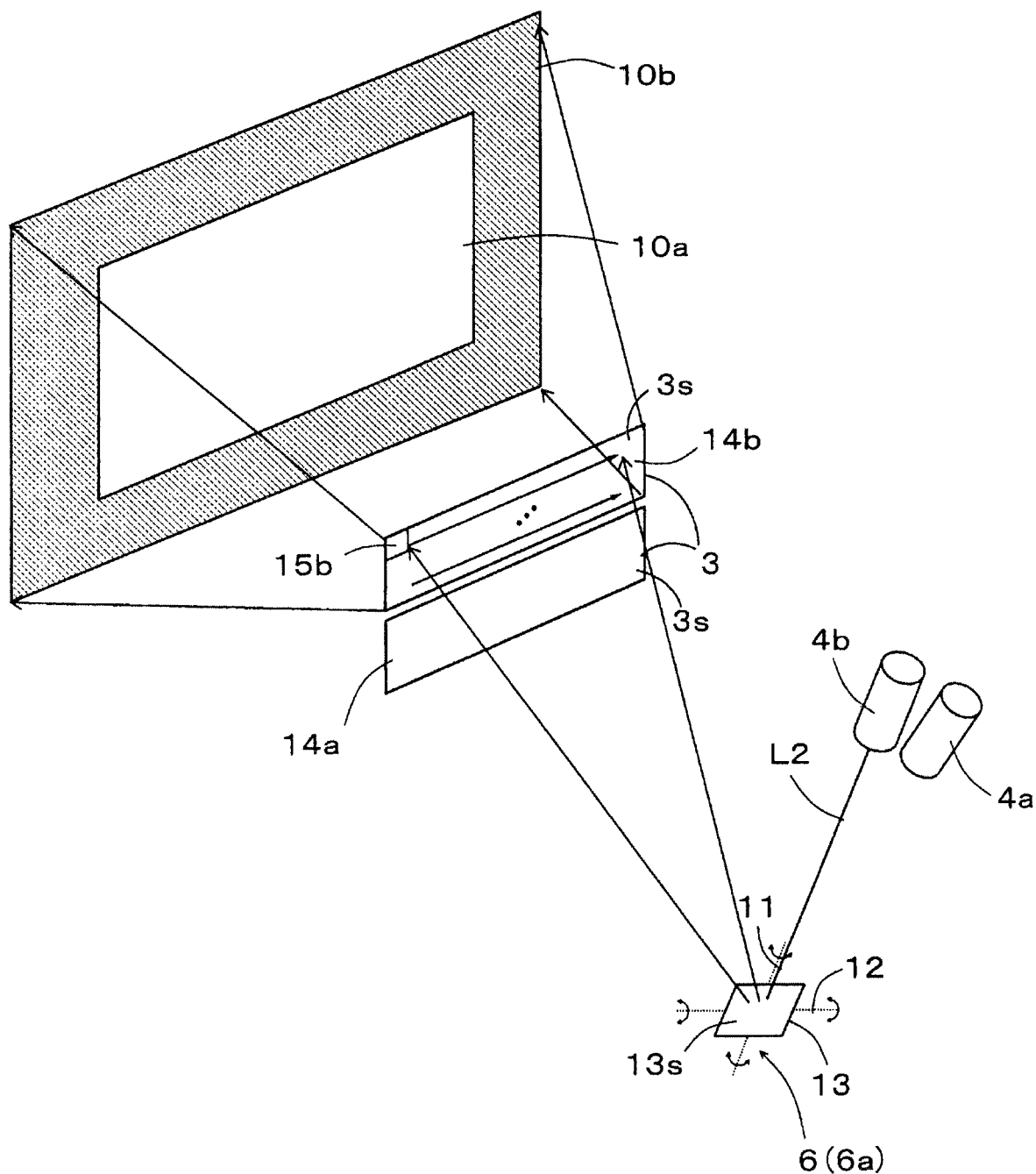
FIG. 2B is a view showing how the optical device is scanned with a second coherent light beam by the light scanning device.

As shown in FIGS. 2A and 2B, for example, the light scanning device 6a includes a reflective device 13 that is rotatable around two rotation axes 11 and 12 extending in mutually intersecting directions. The coherent light beams L1 and L2 from the coherent light source 4, incident on a reflecting surface 13s of the reflective device 13, are reflected at an angle corresponding to the inclination angle of the reflecting surface 13s and travel toward the incident surface 3s of the optical device 3. By rotating the reflective device 13 around the two rotation axes 11 and 12, the coherent light beams L1 and L2 scan the incident surface 3s of the optical device 3 two-dimensionally. For example, since the reflective device 13 repeatedly rotates around the two rotation axes 11 and 12 at a predetermined cycle, the coherent light beams L1 and L2 repeatedly scan the incident surface 3s of the optical device 3 two-dimensionally in synchronization with this cycle.

In the present embodiment, it is assumed that only one light scanning device 6a is provided. Both the first coherent light beam L1 and the second coherent light beam L2 emitted by the coherent light source 4 are incident on the common light scanning device 6a, the traveling directions of the light beams L1 and L2 are changed over time by the light scanning device 6a, and the light beams L1 and L2 scan the optical device 3. However, the mode of the light scanning device 6a is not limited to this, and a light scanning device corresponding to the first coherent light beam L1 and a light scanning device corresponding to the second coherent light beam L2 may be separately provided.

The optical device 3 includes the incident surface 3s on which the first coherent light beam L1 and the second coherent light beam L2 are incident, diffuses the first coherent light beam L1 and the second coherent light beam L2 incident on the incident surface 3s, and illuminates a predetermined area. More specifically, the first coherent light beam L1 diffused by the optical device 3 passes through the first illumination zone 10a and then illuminates a predetermined area that is an actual illumination area. Meanwhile, the second coherent light beam L2 diffused by the optical device 3 passes through the second illumination zone 10b that is at least partially different from the first illumination zone 10a, and then illuminates a predetermined area that is an actual illumination area. In the following, as a specific example, the first illumination zone 10a is an illumination area that conforms to the light distribution standard of headlights of a vehicle prescribed by the traffic regulations of each country, while the second illumination zone 10b is an illumination area outside the light distribution standard of headlights. Examples of the light distribution standard include, but are not limited to, the standards such as JIS D5500 and "Uniform Regulations on Authorization of Adaptive Front-lighting System (AFS) for Vehicle" in Japan, Society of Automotive Engineers (SAE) standards in the United States, and Economic Commission for Europe (ECE) standards in Europe.

Here, the illumination zones 10a and 10b are illumination zones in the near field illuminated by the diffusion regions 14a and 14b in the optical device 3 respectively. The illumination area of the far field is often expressed as a diffusion angle distribution in an angular space rather than as the dimension of the actual illumination zone. In the present specification, the term "illumination zone" includes a diffusion angle area in an angular space in addition to the actual irradiated area (illumination area). Therefore, the predetermined area illuminated by the illumination device 1 of FIG. 1 can be a much wider area than the illumination zones 10a and 10b of the near field shown in FIG. 1.

In the present embodiment, as shown in FIGS. 2A and 2B, the first diffusion region 14a and the second diffusion region 14b each have an elongated shape extending in a uniaxial direction (for example, a left-right direction), and are disposed adjacent to each other in a direction orthogonal to the uniaxial direction (for example, in the vertical direction).

As a usual mode of use of the illumination device 1 according to the present embodiment, it can be assumed that substantially the entire area of the first diffusion region 14a for illuminating an area conforming to the light distribution standard of the headlight is lit, whereas substantially the entire area of the second diffusion region 14b for illuminating an area outside the light distribution standard is turned off. In a case where the first diffusion region 14a and the second diffusion region 14b each having an elongated shape are disposed adjacent to each other in the uniaxial direction, the overall shape is further elongated, making it difficult to secure an installation space at the front face of the vehicle. Also, in this case, one half of the elongated shape is lit but the other half is turned off during normal use of the illumination device 1, resulting in poor design.

As in the present embodiment, on the other hand, if the first diffusion region 14a and the second diffusion region 14b each having an elongated shape are disposed adjacent to each other in a direction orthogonal to the uniaxial direction, both the problem of installation space and the problem of design can be solved.

Figure 3A:
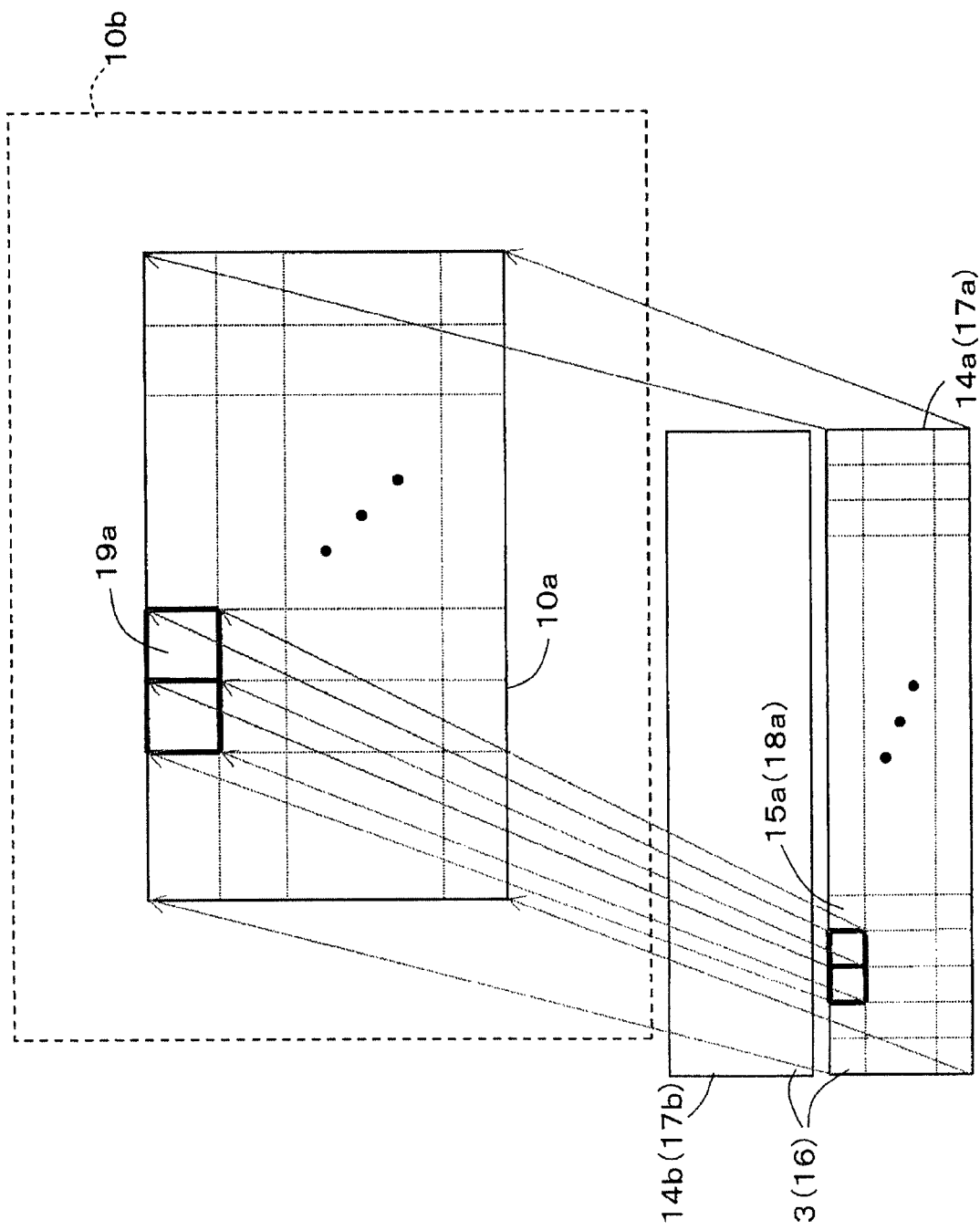
FIG. 3A is a view showing how the first coherent light beam diffused by the optical device is incident on a first illumination zone.
Figure 3B:
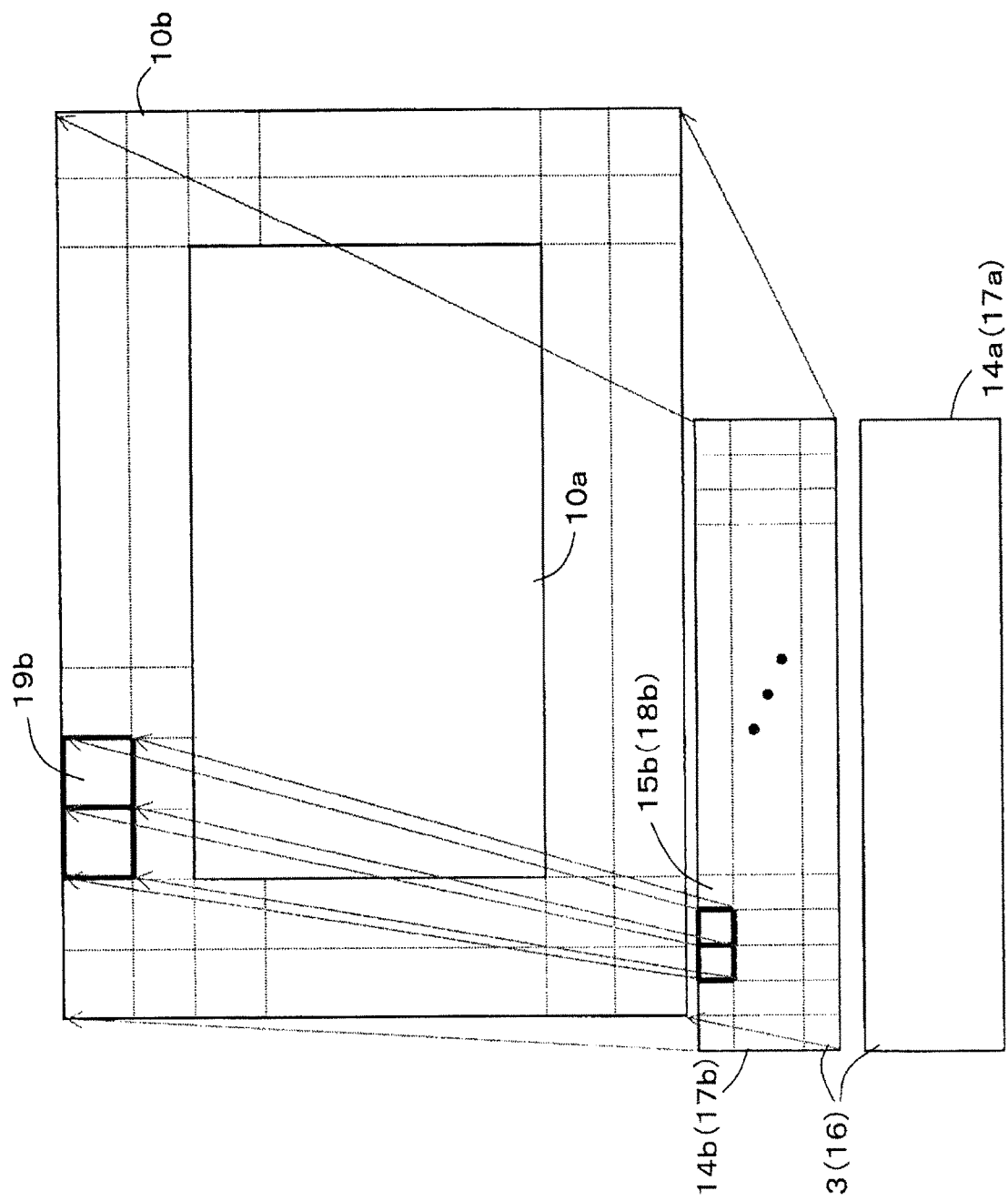
FIG. 3B is a view showing how the second coherent light beam diffused by the optical device is incident on a second illumination zone.

FIG. 3A is a view showing how the first coherent light beam L1 diffused by the optical device 3 is incident on the first illumination zone 10a. FIG. 3B is a view showing how the second coherent light beam L2 diffused by the optical device 3 is incident on the second illumination zone 10a. The optical device 3 includes the first diffusion region 14a corresponding to the first coherent light beam L1 and the second diffusion region 14b corresponding to the second coherent light beam L2. The corresponding coherent light beams L1 and L2 are incident on the diffusion regions 14a and 14b respectively. The first diffusion region 14a diffuses the incident first coherent light beam L1 to illuminate the entire first illumination zone 10a as a whole. Meanwhile, the second diffusion region 14b diffuses the incident second coherent light beam L2 to illuminate the entire second illumination zone 10b as a whole.

As shown in FIG. 3A, the first diffusion region 14a includes a plurality of first element diffusion regions 15a. Each of the first element diffusion regions 15a diffuses the incident first coherent light beam L1 to illuminate a corresponding first partial region 19a in the first illumination zone 10a. At least a part of the first partial region 19a is different for each element diffusion region 15a.

Furthermore, as shown in FIG. 3B, the second diffusion region 14b includes a plurality of second element diffusion regions 15b. Each of the second element diffusion regions 15b diffuses the incident second coherent light beam L2 to illuminate a corresponding second partial region 19b in the second illumination zone 10b. At least a part of the second partial region 19b is different for each element diffusion region 15b.

Specifically, for example, the optical device 3 can be configured using a hologram recording medium 16. As shown in FIGS. 3A and 3B, for example, the hologram recording medium 16 includes a first hologram area 17a and a second hologram area 17b. The first hologram area 17a is provided corresponding to the first coherent light beam L1. The second hologram area 17b is provided corresponding to the second coherent light beam L2. The first coherent light beam L1 incident on the first hologram area 17a is diffused to illuminate the first illumination zone 10a. The second coherent light beam L2 incident on the second hologram area 17b is diffused to illuminate the second illumination zone 10b.

As shown in FIG. 3A, the first hologram area 17a includes a plurality of first element hologram areas 18a. Each of the first element hologram areas 18a illuminates the corresponding first partial region 19a in the first illumination zone 10a by diffusing the incident first coherent light beam L1. At least a part of the first partial region 19a illuminated by each first element hologram area 18a is different for each first element hologram area 18a. That is, the first partial regions 19a illuminated by different first element hologram areas 18a are at least partially different from each other.

Furthermore, as shown in FIG. 3B, the second hologram area 17b includes a plurality of second element hologram areas 18b. Each of the second element hologram areas 18b illuminates the corresponding second partial region 19b in the second illumination zone 10b by diffusing the incident second coherent light beam L2. At least a part of the second partial region 19b illuminated by each second element hologram area 18b is different for each second element hologram area 18b. That is, the second partial regions 19b illuminated by different second element hologram areas 18b are at least partially different from each other.

An interference fringe pattern is formed in each of the element hologram areas 18a and 18b. Therefore, the coherent light beams L1 and L2 incident on the element hologram areas 18a and 18b are diffracted by the interference fringe patterns to illuminate the corresponding partial regions 19a and 19b in the illumination zones 10a and 10b respectively. By adjusting the interference fringe pattern variously, it is possible to change the traveling directions of the coherent light beam L1 and L2 diffracted or diffused by the element hologram areas 18a and 18b respectively.

In this manner, the coherent light beams L1 and L2 incident on the respective spots in the element hologram areas 18a and 18b illuminate the corresponding partial regions 19a and 19b in the illumination zones 10a and 10b respectively. In addition, the light scanning device 6a scans the inside of the element hologram areas 18a and 18b with the coherent light beams L1 and L2, thereby changing, over time, the incident positions and the incident angles of the coherent light beams L1 and L2 incident on the element hologram areas 18a and 18b respectively. The coherent light beams L1 and L2 incident on particular element hologram areas 18a and 18b illuminate the same partial regions 19a and 19b respectively, regardless of the positions where the coherent light beams L1 and L2 are incident on the element hologram areas 18a and 18b. This means that the incident angles of the coherent light beams L1 and L2 incident on the respective spots of the partial regions 19a and 19b change over time. This change in the incident angle occurs at a rate that is impossible to resolve by the human eye. As a result, scattering patterns of the coherent light beams L1 and L2 having no correlation are multiplexed and observed by the human eye. Therefore, the speckles generated corresponding to each scattering pattern are overlapped and averaged, and observed by the observer. As a result, the speckles become less conspicuous in the illumination zones 10a and 10b. The coherent light beams L1 and L2 from the light scanning device 6a sequentially scan the element hologram areas 18a and 18b of the hologram areas 17a and 17b respectively. Therefore, the coherent light beams L1 and L2 diffracted at respective spots in the element hologram areas 18a and 18b have different wavefronts, and these diffracted coherent light beams L1 and L2 are independently superimposed on the illumination zones 10a and 10b. As a result, a uniform illuminance distribution, in which the speckles are not conspicuous, can be obtained in the illumination zones 10a and 10b.

FIG. 3A shows an example in which the first element hologram areas 18a each illuminate a different first partial region 19a in the first illumination zone 10a, but the first partial region 19a may partially overlap the adjacent first partial region 19a. In addition, the size of the first partial region 19a may be different for each first element hologram area 18a. Furthermore, it is not necessary for the corresponding first partial regions 19a to be arranged in the first illumination zone 10a according to the arrangement order of the first element hologram areas 18a. In other words, the arrangement order of the first element hologram areas 18a in the first hologram area 17a and the arrangement order of the corresponding first partial regions 19a in the first illumination zone 10a do not necessarily have to match.

Similarly, FIG. 3B shows an example in which the second element hologram areas 18b each illuminate a different second partial region 19b in the second illumination zone 10b, but the second partial region 19b may partially overlap the adjacent second partial region 19b. In addition, the size of the second partial region 19b may be different for each second element hologram area 18b. Furthermore, it is not necessary for the corresponding second partial regions 19b to be arranged in the second illumination zone 10b according to the arrangement order of the second element hologram areas 18b. In other words, the arrangement order of the second element hologram areas 18b in the second hologram area 17b and the arrangement order of the corresponding second partial regions 19b in the second illumination zone 10b do not necessarily have to match.

Next, the structure of the hologram recording medium 16 will be described in detail.

The hologram recording medium 16 can be produced using, for example, a scattered light beam from an actual scattering plate as an object light beam. More specifically, when a hologram photosensitive material as the base material of the hologram recording medium 16 is irradiated with a reference light beam and an object light beam made of coherent light beams having mutual coherence, the interference fringe patterns due to the interference between these light beams are formed on the hologram photosensitive material, whereby the hologram recording medium 16 is produced. A laser light beam, which is a coherent light beam, is used as the reference light beam. A scattered light beam of an isotropic scattering plate, which can be incident at low cost, for example, is used as the object light beam.

By irradiating the hologram recording medium 16 with a coherent light beam from the focal position of the reference light beam used for producing the hologram recording medium 16, a reproduced image of the scattering plate, serving as the source of the object light beam used for producing the hologram recording medium 16, is generated at the disposing position of the scattering plate. If uniform surface scattering occurs on the scattering plate serving as the source of the object light beam used for producing the hologram recording medium 16, the reproduced image of the scattering plate obtained by the hologram recording medium 16 is also generated with uniform surface illumination, and the area where the reproduced image of the scattering plate is generated becomes the illumination zones 10a and 10b.

In the present embodiment, illumination control for not illuminating only a part of the illumination zone can be performed using the optical device 3. When such illumination control is performed using the hologram recording medium 16, the interference fringe patterns formed in the respective element hologram areas 18a and 18b become complicated. Instead of being formed using an actual object light beam and an actual reference light beam, such complicated interference fringe patterns can be designed using a computer on the basis of, for example, the wavelength and incident direction of a scheduled reproduction illumination light beam, and the shape and position of an image to be reproduced. The hologram recording medium 16 obtained in this way is also called a computer generated hologram (CGH). In addition, a Fourier transform hologram having the same diffusion angle characteristic at each point on the respective element hologram areas 18a and 18b may be formed by computer synthesis. Furthermore, an optical member such as a lens may be provided on the rear side of the optical axis of the illumination zones 10a and 10b to set the size and position of the actual illumination area.

One of the advantages obtained by providing the hologram recording medium 16 as the optical device 3 is that the optical energy density of the coherent light beams L1 and L2 can be reduced by diffusion. In addition, another advantage is that the hologram recording medium 16 can be used as a surface light source having directivity. Therefore, as compared to the conventional lamp light source (point light source), it is possible to reduce the luminance on the light source surface necessary for achieving the same illuminance distribution. This makes it possible to contribute to improvement of the safety of a coherent light beam, and the coherent light beams L1 and L2 that have passed through the illumination zones 10a and 10b are, even if looked at directly with the human eyes, less likely to affect the human eyes adversely than the case of looking directly at a single point light source.

Figure 5:
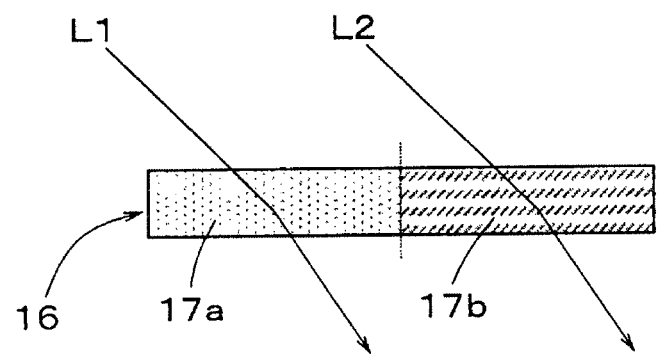
FIG. 5 is a view in which a first hologram area and a second hologram area are disposed adjacent to each other along an incident surface of a hologram recording medium.

In the example shown in FIGS. 1 to 3B, the first hologram area 17a and the second hologram area 17b are disposed adjacent to each other along the incident surfaces of the respective hologram areas 17a and 17b as shown in FIG. 5.

Figure 6:
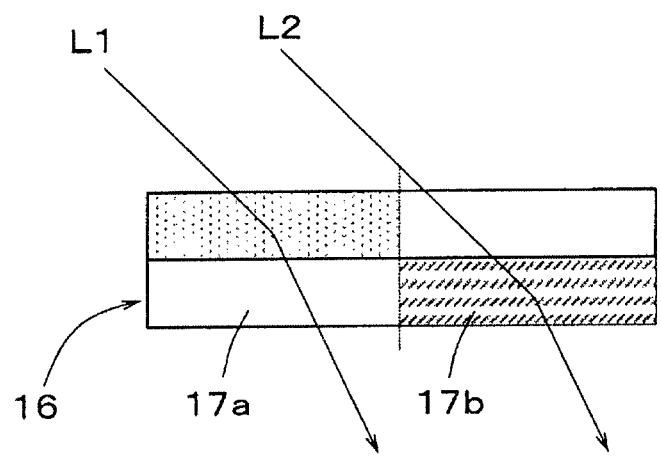
FIG. 6 is a view in which the first hologram area and the second hologram area are disposed in a stacking direction.
Figure 7:
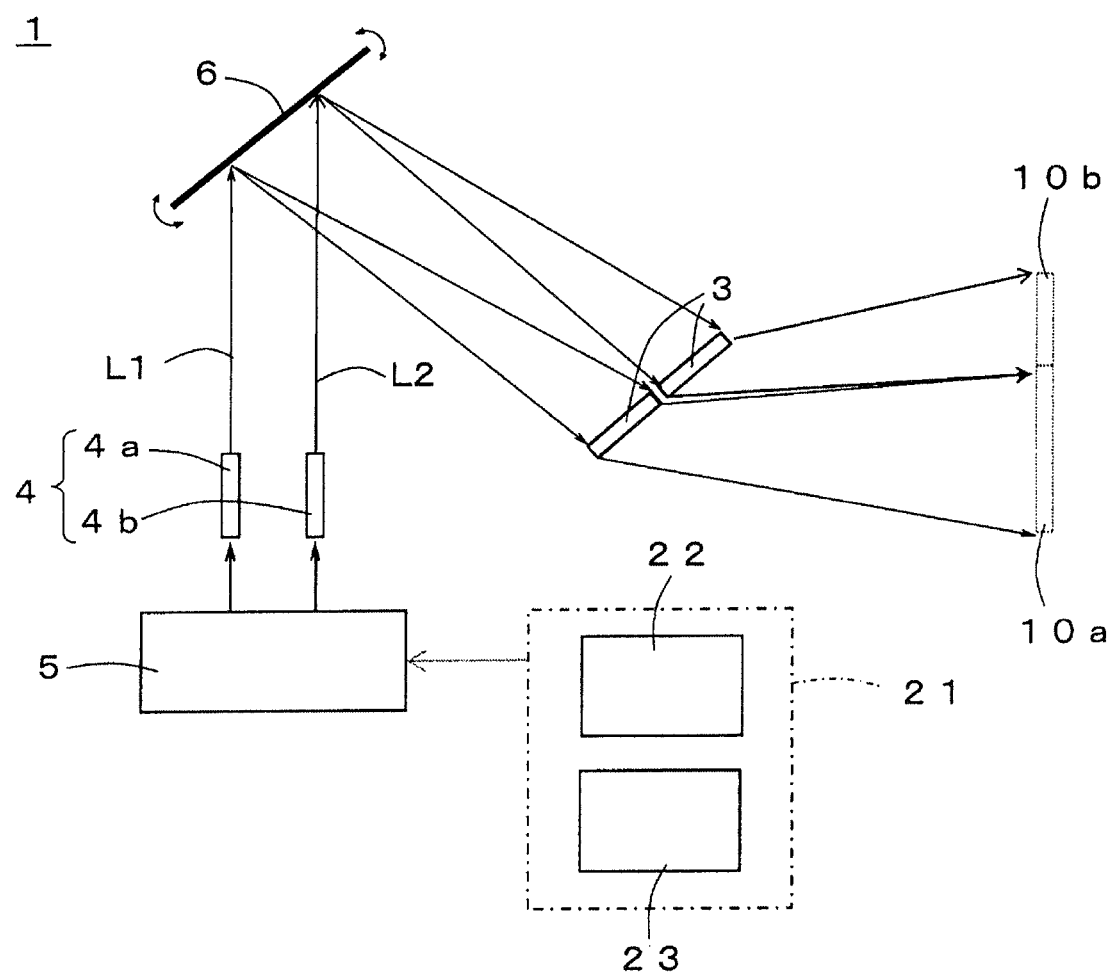
FIG. 7 is a diagram showing a schematic configuration of an illumination device according to a second embodiment of the present invention.
Figure 8:
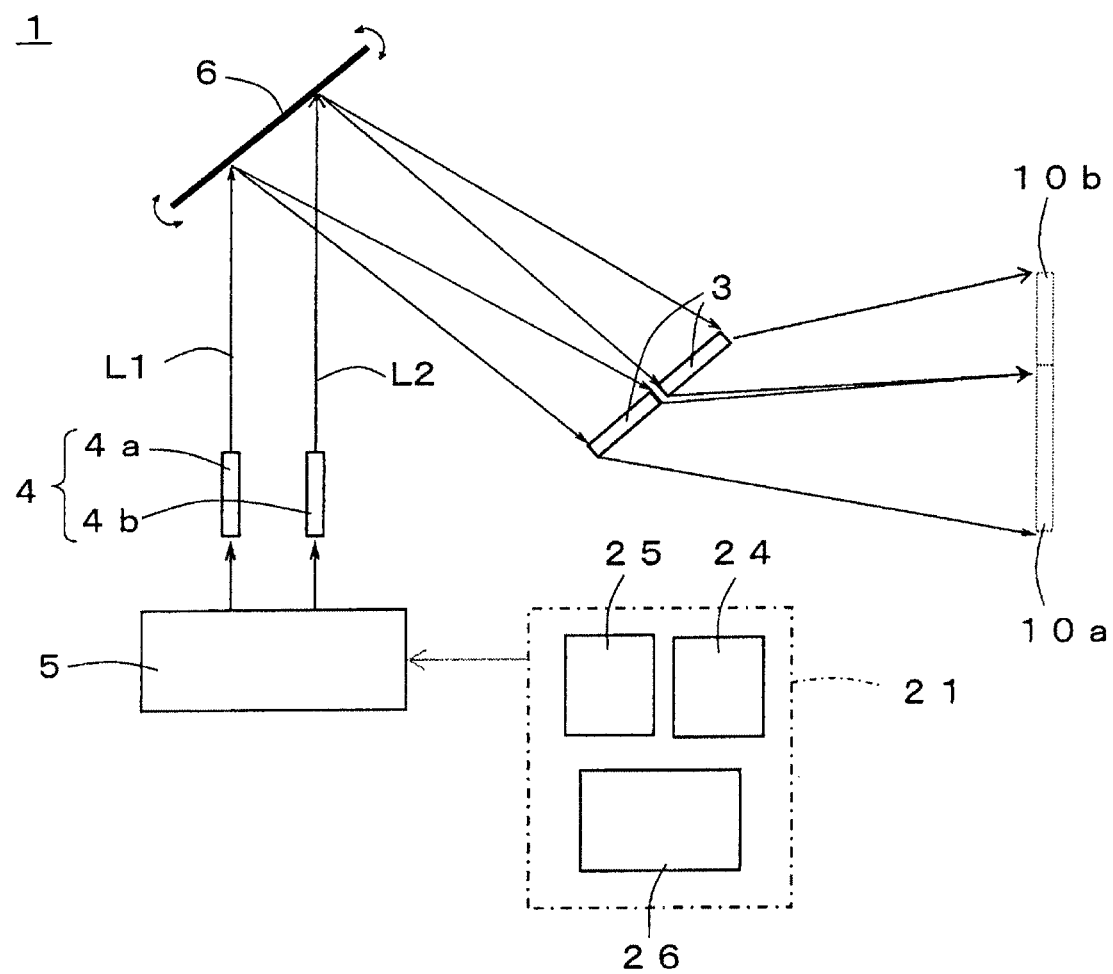
FIG. 8 is a diagram showing a schematic configuration of an illumination device according to a third embodiment of the present invention.

In this way, the first hologram area 17a and the second hologram area 17b are disposed adjacent to each other along the incident surfaces. Alternatively, as shown in FIG. 6, the first hologram area 17a and the second hologram area 17b may be disposed in the stacking direction. In this case, interference fringe patterns of the respective hologram areas 17a and 17b are formed in the layers of the respective hologram areas 17a and 17b. The respective hologram areas 17a and 17b preferably have as high a visible light transmittance as possible, such that the coherent light beams L1 and L2 from the light scanning device 6a reach, with the minimum loss possible, from the surface of the hologram recording medium 16, on which the coherent light beams L1 and L2 are incident, to a hologram area in the deep side. In addition, when the interference fringe patterns are formed at positions overlapping in the stacking direction, the coherent light beams L1 and L2 hardly reach the layer far from the surface. Therefore, as shown in FIG. 6, the interference fringe patterns are desirably formed in the respective layers while being shifted in the stacking direction.

FIG. 1 shows the example in which the coherent light beams L1 and L2 from the light scanning device 6a pass through the optical device 3 and is diffused, but the optical device 3 may diffuse and reflect the coherent light beams L1 and L2. For example, in a case where the hologram recording medium 16 is used as the optical device 3, the hologram recording medium 16 may be of either a reflective type or a transmissive type. Generally, the reflective hologram recording medium 16 (hereinafter, reflective hologram) has a higher wavelength selectivity than the transmissive hologram recording medium 16 (hereinafter, transmissive hologram). That is, even when the interference fringe patterns corresponding to different wavelengths are stacked, the reflective hologram can diffract a coherent light beam having a desired wavelength only in a desired layer. The reflective hologram is also superior in that it is easy to remove the influence of a zero-order light beam. On the other hand, the transmissive hologram has a wide diffractable spectrum and a high tolerance for the coherent light source 4, but when the interference fringe patterns corresponding to different wavelengths are stacked, a coherent light beam having a desired wavelength is diffracted also in a layer other than the desired layer. Therefore, in general, it is difficult to form a stacked structure using the transmissive hologram.

Specific forms of the hologram recording medium 16 may include a volume hologram recording medium using a photopolymer, and a volume hologram recording medium that performs recording using a photosensitive medium containing a silver salt material. Alternatively, a hologram recording medium of a relief type (emboss type) may be used.

In the present embodiment, the light scanning device 6a is configured to periodically scan the incident surface 3s of the optical device 3 with the first coherent light beam L1 and the second coherent light beam L2 from the coherent light source 4, and the timing control unit 5 individually controls the emission timing of the first coherent light beam L1 and the second coherent light beam L2 in synchronization with the scanning timing of the first coherent light beam L1 and the second coherent light beam L2 by the light scanning device 6a.

Figure 4A:
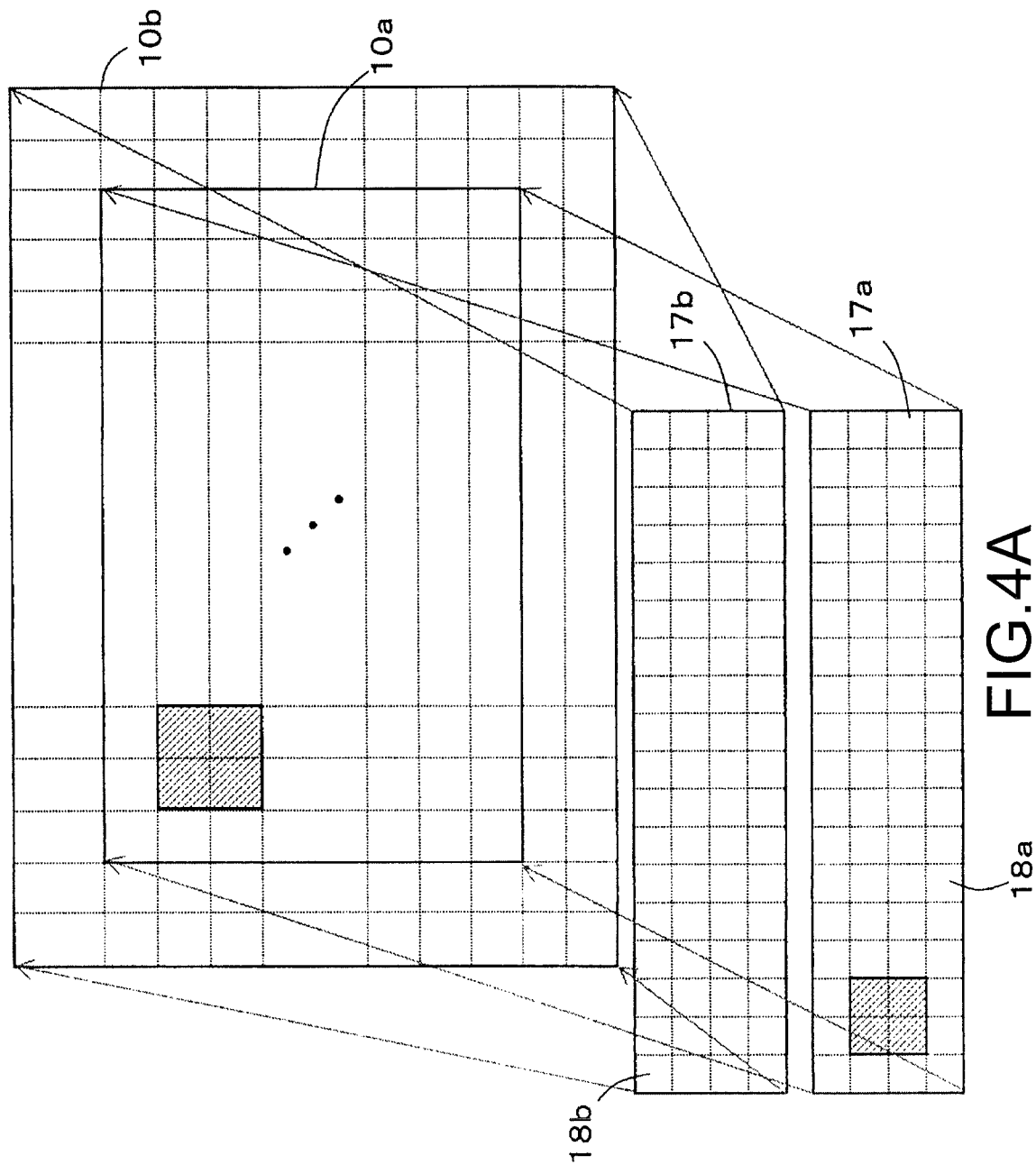
FIG. 4A is a view showing an example of illuminating an arbitrary area within the first illumination zone by controlling the emission timing of the first coherent light beam.

By controlling whether to irradiate each first element hologram area 17a with the first coherent light beam L1 by the timing control unit 5, an arbitrary region within the first illumination zone 10a can be selectively illuminated as shown in FIG. 4A. At this time, the first partial regions 19a in the selected region are sequentially illuminated by the first coherent light beam L1 at such a speed as if illuminated simultaneously, when viewed with the human eyes.

Figure 4B:
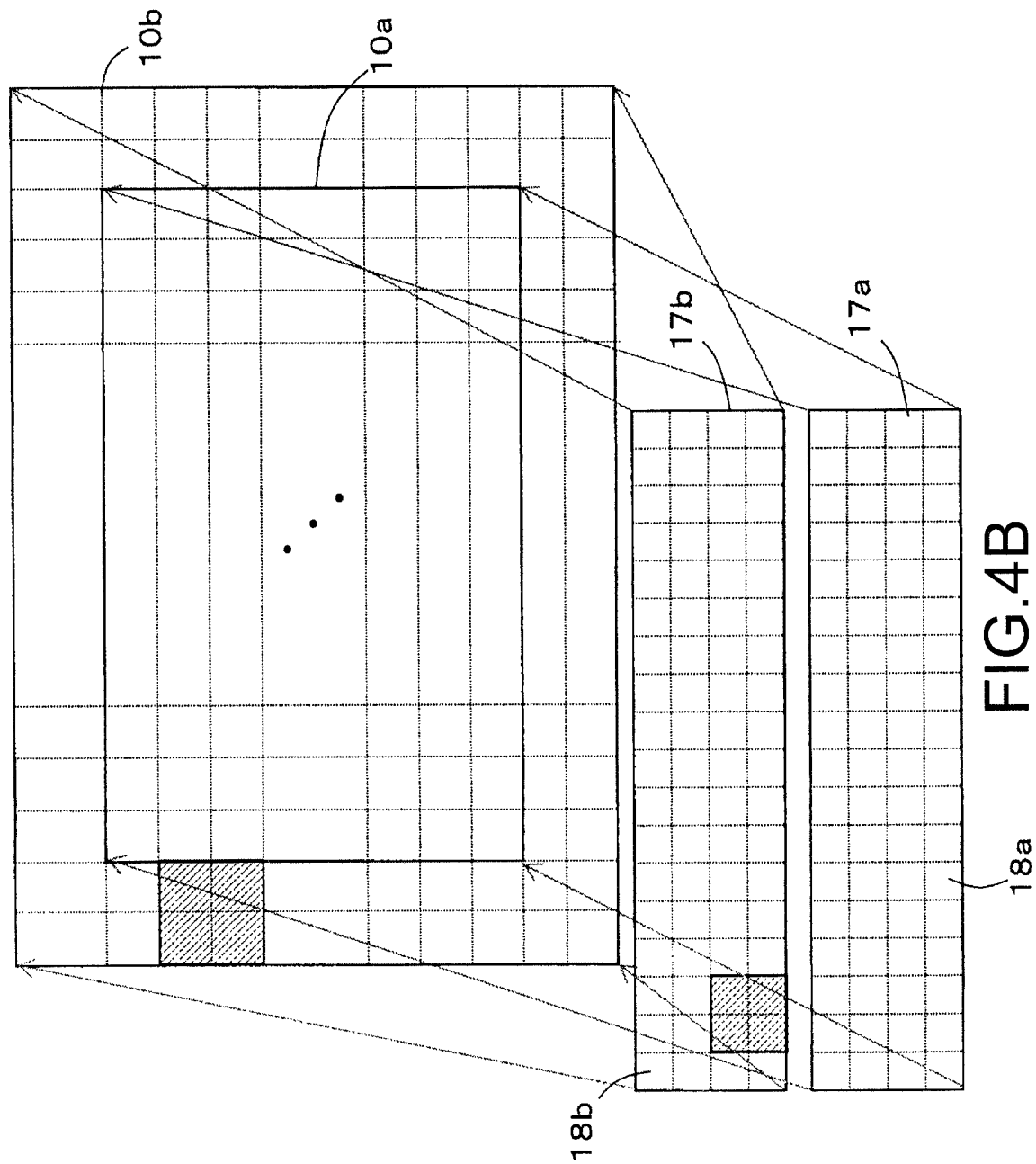
FIG. 4B is a view showing an example of illuminating an arbitrary area within the second illumination zone by controlling the emission timing of the second coherent light beam.

In addition, by controlling whether to irradiate each second element diffusion region 15b with the second coherent light beam L2 by the timing control unit 5, an arbitrary region within the second illumination zone 10b can be selectively illuminated as shown in FIG. 4B. At this time, the second partial regions 19b in the selected region are sequentially illuminated by the second coherent light beam L2 at such a speed as if illuminated simultaneously, when viewed with the human eyes.

Next, the operation of the present embodiment having such a configuration will be described with reference to FIGS. 9 to 12.

Figure 9:
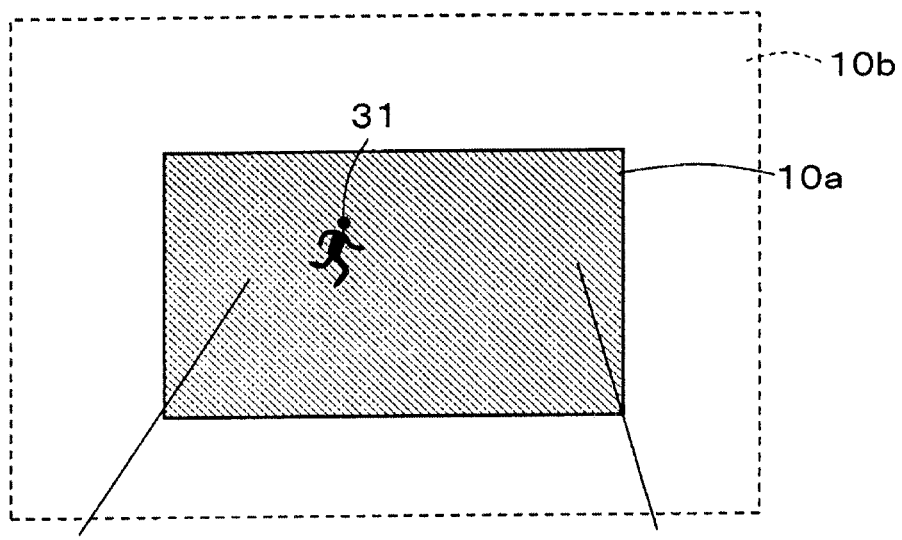
FIG. 9 is a view showing an example of illuminating an area conforming to the high beam standard in the first illumination zone.

As shown in FIG. 9, in a case where there is no vehicle traveling ahead or oncoming vehicle within the first illumination zone 10a, the timing control unit 5 controls the emission timing of the first coherent light beam L1 so as to illuminate an area conforming to the high beam (also referred to as a traveling headlight) standard (in the illustrated example, the entire first illumination zone 10a).

More specifically, for example, the timing control unit 5 controls the emission timing of the first coherent light beam L1 such that the entire first hologram area 17*a* is irradiated with the first coherent light beam L1. As a result, as shown in FIG. 9, the entire first illumination zone 10*a* is illuminated, making it possible to visually recognize a pedestrian 31 or the like walking ahead.

Figure 10:
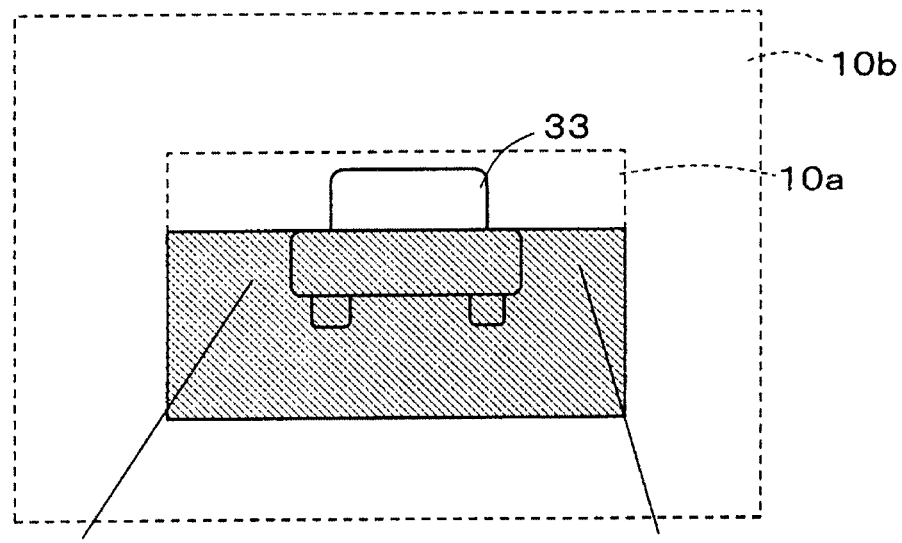
FIG. 10 is a view showing an example of illuminating an area conforming to the low beam standard in the first illumination zone.

On the other hand, as shown in FIG. 10, in a case where there is a vehicle 33 traveling ahead or an oncoming vehicle within the first illumination zone 10*a*, the timing control unit 5 controls the emission timing of the first coherent light beam L1 so as to illuminate an area conforming to the low beam (also referred to as a passing headlight) standard (for example, an area below the horizontal plane in the first illumination zone 10*a*).

Specifically, for example, the timing control unit 5 identifies the partial regions 19 corresponding to the area conforming to the low beam standard from among the plurality of first partial regions 19*a* in the first illumination zone 10*a*, and controls the emission timing of the first coherent light beam L1 such that the first element hologram areas 18*a* corresponding to the identified partial regions 19 are irradiated with the first coherent light beam L1 but the other first element hologram areas 18*a* are not irradiated with the first coherent light beam L1. As a result, as shown in FIG. 10, the area conforming to the low beam standard in the first illumination zone 10*a* is illuminated, while the other area in the first illumination zone 10*a* is not illuminated. It is therefore possible to prevent the first coherent light beam L1 from dazzling a driver of the vehicle 33 traveling ahead or the oncoming vehicle.

Figure 11:
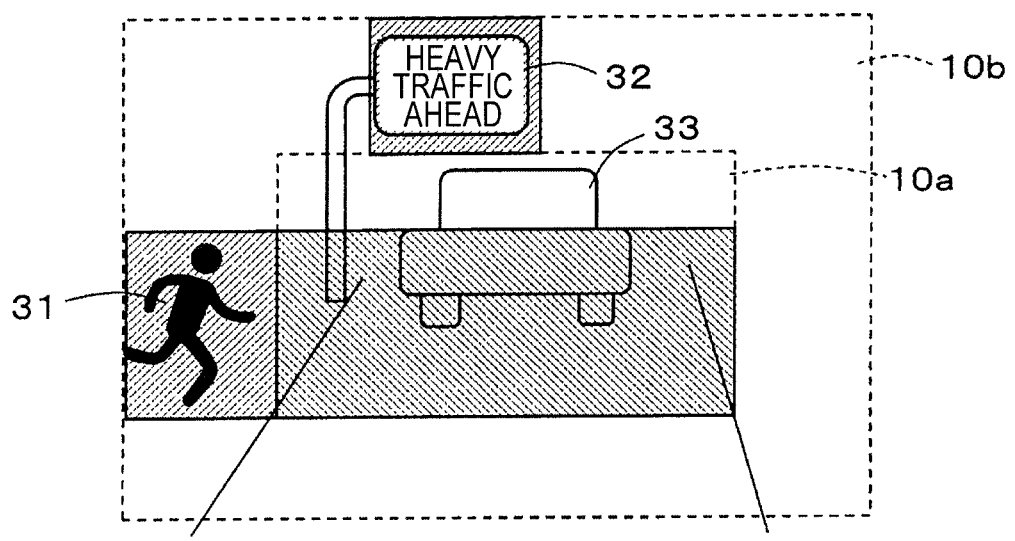
FIG. 11 is a view showing an example of illuminating an object in the second illumination zone.

Furthermore, as shown in FIG. 11, in a case where there is the vehicle 33 traveling ahead or an oncoming vehicle within the first illumination zone 10*a*, and there are objects such as the pedestrian 31 and a traffic sign 32 within the second illumination zone 10*b* outside the light distribution standard of the headlight, the timing control unit 5 controls the emission timing of the first coherent light beam L1 so as to illuminate an area conforming to the low beam (also referred to as a passing headlight) standard (for example, an area below the horizontal plane in the first illumination zone 10*a*) and controls the emission timing of the second coherent light beam L2 so as to illuminate the objects 31 and 32 within the second illumination zone 10*b*.

Specifically, for example, in a similar manner to the example shown in FIG. 10, the timing control unit 5 identifies the first partial regions 19*a* corresponding to the area conforming to the low beam standard from among the plurality of first partial regions 19*a* in the first illumination zone 10*a*, and controls the emission timing of the first coherent light beam L1 such that the first element hologram areas 18*a* corresponding to the identified first partial regions 19*a* are irradiated with the first coherent light beam L1 but the other first element hologram areas 18*a* are not irradiated with the first coherent light beam L1. As a result, as shown in FIG. 12, the area conforming to the low beam standard in the first illumination zone 10*a* is illuminated, while the other area in the first illumination zone 10*a* is not illuminated.

Furthermore, the timing control unit 5 identifies the second partial regions 19*b* at least partially overlapping the objects 31 and 32 from among the plurality of second partial regions 19*b* in the second illumination zone 10*b*, and controls the emission timing of the second coherent light beam L2 such that the second element hologram areas 18*b* corresponding to the identified second partial regions 19*b* are irradiated with the second coherent light beam L2 but the other second element hologram areas 18*b* are not irradiated with the second coherent light beam L2. As a result, as shown in FIG. 12, the area at least partially overlapping the objects 31 and 32 in the second illumination zone 10*b* is illuminated, while the other area in the second illumination zone 10*b* is not illuminated. As a result, it is possible to draw the driver's attention to the pedestrian 31 and the traffic sign 32 located in the area outside the light distribution standard, and to avoid dazzling the driver of an oncoming vehicle with the second coherent light beam L2 for illuminating the area outside the light distribution standard.

According to the present embodiment as described above, the timing control unit 5 controls the timing at which the first coherent light beam L1 for scanning the first diffusion region 14*a* and the second coherent light beam L2 for scanning the second diffusion region 14*b* are incident on the optical device 3, or the timing at which the first illumination zone 10*a* and the second illumination zone 10*b* are irradiated with the first coherent light beam L1 diffused in the first diffusion region 14*a* and the second coherent light beam L2 diffused in the second diffusion region 14*b* respectively. This makes it possible to arbitrarily change the illumination modes of the first illumination zone 10*a* and the second illumination zone 10*b*. As a specific example, according to the present embodiment, the first illumination zone 10*a* that conforms to the light distribution standard of the headlight can be illuminated by the diffusion of the first coherent light beam L1 in the first diffusion region 14*a*, and the second illumination zone 10*b* which is the area outside the light distribution standard can be illuminated by the diffusion of the second coherent light beam L2 in the second diffusion region 14*b*. Therefore, both the zone 10*a* conforming to the light distribution standard of the headlight and the zone 10*b* outside the light distribution standard can be illuminated.

Furthermore, according to the present embodiment, the first diffusion region 14*a* includes a plurality of first element diffusion regions 15*a*, and each first element diffusion region 15*a* illuminates the corresponding first partial region 19*a* in the first illumination zone 10*a*. Therefore, by controlling whether to irradiate each first element diffusion region 15*a* with the first coherent light beam L1 using the timing control unit 5, an arbitrary region in the first illumination zone 10*a* can be selectively illuminated. As a result, it becomes easy to selectively illuminate the area conforming to the high beam standard and the area conforming to the low beam standard in the first illumination zone 10*a*, and in the case where there is the vehicle 33 traveling ahead or the oncoming vehicle in the first illumination zone 10*a*, it is possible to prevent the first coherent light beam L1 from dazzling the driver of the vehicle 33 traveling ahead or the oncoming vehicle.

Furthermore, according to the present embodiment, the second diffusion region 14*b* includes a plurality of second element diffusion regions 15*b*, and each second element diffusion region 15*b* illuminates the corresponding second partial region 19*b* in the second illumination zone 10*b*. Therefore, by controlling whether to irradiate each second element diffusion region 15*b* with the second coherent light beam L2 using the timing control unit 5, an arbitrary region in the second illumination zone 10*b* can be selectively illuminated. Thus, by selectively illuminating the pedestrian 31 and the traffic sign 32 located in the second illumination zone 10*b* outside the light distribution standard, it is possible to draw the driver's attention to these objects, and to prevent the second coherent light beam L2 from dazzling the driver of the oncoming vehicle.

Furthermore, according to the present embodiment, the light scanning device 6*a* scans the element diffusion regions 15a and 15b with the coherent light beams L1 and L2, and the coherent light beams L1 and L2 incident on the respective spots in the element diffusion regions 15a and 15b illuminate the entire corresponding partial regions 19a and 19b respectively. Therefore, the incident angles of the coherent light beams L1 and L2 in the respective partial regions 19a and 19b in the illumination zones 10a and 10b change over time, making the speckles in the illumination zones 10a and 10b inconspicuous.

Note that various modifications can be made to the above-described embodiment. Hereinafter, modifications will be described with reference to the drawings. In the following description and the drawings used in the following description, parts that can be configured similarly to the above-described embodiment are denoted with the same reference signs as those used for the corresponding parts in the above-described embodiment, and the duplicate description will be omitted. In addition, in a case where it is obvious that the operation and effect obtained in the above-described embodiment can also be obtained in a modification, the description thereof may be omitted.

FIG. 9 is a diagram showing a schematic configuration of an illumination device 1 according to a second embodiment of the present invention.

As shown in FIG. 9, the illumination device 1 according to the second embodiment further includes an object detection unit 21 that detects an object existing in a second illumination zone 10b.

More specifically, the object detection unit 21 includes an imaging device 22 that images the inside of the second illumination zone 10b, and an image processing unit 23 that performs image processing on the imaging result of the imaging device 22 and recognizes an object in the second illumination zone 10b.

As the imaging device 22, for example, a commercially available imaging device equipped with a CCD that converts a light beam emitted or reflected from an object existing in the second illumination zone 10b into an electric signal can be used. The image processing unit 23 performs image processing on the imaging result of the imaging device 22 to determine whether an object exists in the second illumination zone 10b. In a case where it is determined that the object exists, the image processing unit 23 identifies second partial regions 19b at least partially overlapping the object in the second illumination zone 10b.

A timing control unit 5 controls the emission timing of a second coherent light beam L2 so as to illuminate the object detected by the object detection unit 21.

Specifically, for example, the timing control unit 5 controls the emission timing of the second coherent light beam L2 such that second element hologram areas 18b corresponding to the second partial regions 19b identified by the image processing unit 23 are irradiated with the second coherent light beam L2 but the other second element hologram areas 18b are not irradiated with the second coherent light beam L2. This makes it possible for a driver driving a vehicle to automatically illuminate the object in the second illumination zone 10b without manually selecting an area to be illuminated in the second illumination zone 10b, and thus the safety of driving can be improved.

FIG. 10 is a diagram showing a schematic configuration of an illumination device 1 according to a third embodiment of the present invention.

As shown in FIG. 10, in the third embodiment, an object detection unit 21 includes a position information acquisition unit 24 that acquires position information of a vehicle, a storage unit 25 that stores position information of an object, and an information processing unit 26 that recognizes an object in a second illumination zone 10b on the basis of the position information of the vehicle acquired by the position information acquisition unit 24 and the position information of the object stored in the storage unit 25.

As the position information acquisition unit 24, for example, a commercially available GPS receiver that acquires position information of a vehicle using the global positioning system (GPS) can be used. The storage unit 25 may store map data of a wide area in advance, or may read and store, as necessary, only map data around the current position of the vehicle from an external database.

The information processing unit 26 determines whether the object exists in the second illumination zone 10b on the basis of the position information of the vehicle acquired by the position information acquisition unit 24 and the position information of the object stored in the storage unit 25. In a case where it is determined that the object exists, the information processing unit 26 identifies second partial regions 19b at least partially overlapping the object in the second illumination zone 10b.

According to the third embodiment as described above, even when an imaging device 22 cannot clearly image the inside of the second illumination zone due to bad weather or the like, it is possible to properly recognize and illuminate the object as long as the object is stored in the storage unit 25.

Note that the specific form of the optical device 3 is not limited to the hologram recording medium 16, and may be various diffusion members that can be finely divided into the plurality of element diffusion regions 15a and 15b. For example, the optical device 3 may be configured using a lens array group in which each of the element diffusion regions 15a and 15b is a single lens array. In this case, a lens array is provided for each of the element diffusion regions 15a and 15b, and the shape of each lens array is designed such that the lens arrays in the first diffusion region 14a illuminate the corresponding first partial regions 19a in the first illumination zone 10a, and the lens arrays in the second diffusion region 14b illuminate the corresponding partial regions 19b in the second illumination zone 10b. The first partial regions 19a in the first illumination zone 10a are at least partially different from each other, and the second partial regions 19b in the second illumination zone 10b are also at least partially different from each other. As a result, as in the case of configuring the optical device 3 using the hologram recording medium 16, by arbitrarily adjusting the emission timing of the first coherent light beam L1, the illumination mode at an arbitrary position in the first illumination zone 10a can be made different from the illumination mode of another position in the first illumination zone 10a, and by arbitrarily adjusting the emission timing of the second coherent light beam L2, the illumination mode of an arbitrary position in the second illumination zone 10b can be made different from the illumination mode of another position in the second illumination zone 10b.

In the above-described embodiments, the light scanning device 6a is used to scan the optical device 3 with the first coherent light beam L1 and the second coherent light beam L2 from the coherent light source 4. However, the invention is not limited to this example, and the following configuration may be adopted: a first laser array that emits the first coherent light beam L1 and a second laser array that emits the second coherent light beam L2 are provided in the coherent light source 4, and the first coherent light beam L1 from the first laser array illuminates the first diffusion region 14a of the optical device 3 and the second coherent light beam L2 from the second laser array illuminates the second diffusion region 14b of the optical device 3. In this case, the light scanning device 6a can be omitted, thus simplifying the device configuration. However, in order to suppress the occurrence of speckles, it is more preferable to adopt the configuration in which the light scanning device 6a scans the optical device 3 with the first coherent light beam L1 and the second coherent light beam L2.

In the above-described embodiments, the coherent light beam having a single emission wavelength range is used as the first coherent light beam L1. However, the invention is not limited to this example, and a plurality of laser light sources that emit coherent light beams having different emission wavelength ranges may be provided as the first light source unit 4a and a plurality of first diffusion regions 14a corresponding to the respective coherent light beams having different emission wavelength ranges may be provided in the optical device 3, whereby the coherent light beams having different emission wavelength ranges, diffused by the respective first diffusion regions 14a, may overlap in and illuminate the first illumination zone 10a. For example, in a case where a red coherent light beam, a green coherent light beam, and a blue coherent light beam are used as the first coherent light beams L1, the beams of these three colors are mixed in and illuminate the first illumination zone 10a in white.

Similarly, in the above-described embodiments, the coherent light beam having a single emission wavelength range is used as the second coherent light beam L2. However, the invention is not limited to this example, and a plurality of laser light sources that emit coherent light beams having different emission wavelength ranges may be provided as the second light source unit 4b and a plurality of second diffusion regions 14b corresponding to the respective coherent light beams having different emission wavelength ranges may be provided in the optical device 3, whereby the coherent light beams having different emission wavelength ranges, diffused by the respective second diffusion regions 14a, may overlap in and illuminate the second illumination zone 10a. For example, in a case where a red coherent light beam, a green coherent light beam, and a blue coherent light beam are used as the second coherent light beams L2, the beams of these three colors are mixed in and illuminate the second illumination zone 10b in white.

In the first to third embodiments described above, the example has been described in which the first illumination zone 10a that conforms to the light distribution standard of a headlight of a vehicle and the second illumination zone 10b that does not conform to the light distribution standard are provided. However, the illumination devices according to the first to third embodiments can also be applied to use other than the light distribution standard of a headlight of a vehicle. For example, in a case of illuminating a stage in a concert venue, the first illumination zone 10a may be used as main illumination and the second illumination zone 10b may be used as sub illumination on the stage. It is desirable that a part of the partial regions 19 in the first illumination zone 10a not be illuminated as necessary, so as not to dazzle a person on the stage with the illumination light beam. In addition, the first illumination zone 10a may be set at the center of the stage, while the second illumination zone 10b may be set around the stage. As a result, a person in the center of the stage can be illuminated in the first illumination zone 10a, and a person appearing from the side of the stage can be illuminated in the second illumination zone 10b. Even if a person moves on the stage, it is possible to track and illuminate the moving person by selectively turning on/off the illumination of each partial region in the first illumination zone 10a and the second illumination zone 10b. In a case where the first coherent light beam L1 and the second coherent light beam L2 include light beams having a plurality of wavelength ranges, the illumination color of the stage can arbitrarily be changed.

In the first to third embodiments described above, the example has been described in which the second illumination zone 10b is arranged so as to surround the first illumination zone 10a, and the positions and sizes of the first illumination zone 10a and the second illumination zone 10b are fixed. However, the position and size of at least one of the first illumination zone 10a and the second illumination zone 10b may arbitrarily be adjusted. As an example, if the scanning range of at least one of the first coherent light beam L1 and the second coherent light beam L2 on the optical device 3 can be adjusted by the scanning unit 6, the position and size of at least one of the first illumination zone 10a and the second illumination zone 10b can be adjusted. Alternatively, apart from the scanning unit 6, some other optical member may be added to adjust the position and size of at least one of the first illumination zone 10a and the second illumination zone 10b. As a result, the positions and sizes of the first illumination zone 10a and the second illumination zone 10b, and the degree of overlap between the first illumination zone 10a and the second illumination zone 10b can be adjusted afterward.

Note that the individual embodiments described above do not limit the disclosed invention. The respective embodiments can appropriately be combined as long as the processing contents thereof are consistent.

REFERENCE SIGNS LIST

1 Illumination device
3 Optical device
3s Incident surface
4 Coherent light source
4a First light source unit
4b Second light source unit
5 Timing control unit
6 Scanning unit
6a Light scanning device
10a First illumination zone
10b Second illumination zone
11, 12 Rotation axis
13 Reflective device
13s Reflecting surface
14a First diffusion region
14b Second diffusion region
15a First element diffusion region
15b Second element diffusion region
16 Hologram recording medium
17a First hologram area
17b Second hologram area
18a First element hologram area
18b Second element hologram area
19a First partial region
19b Second partial region
21 Object detection unit
22 Imaging device
23 Image processing unit
24 Position information acquisition unit
25 Storage unit
26 Information processing unit
31 Object (pedestrian)
32 Object (traffic sign)
33 Vehicle traveling ahead

The invention claimed is:

1. An illumination device comprising:
a coherent light source that emits a first coherent light beam and a second coherent light beam;
an optical device that diffuses the first coherent light beam to illuminate a first illumination zone and diffuses the second coherent light beam to illuminate a second illumination zone; and
a timing control unit that controls an emission timing of the first coherent light beam and the second coherent light beam,
wherein the optical device includes a first diffusion region on which the first coherent light beam is incident, and a second diffusion region on which the second coherent light beam is incident,
the first diffusion region is capable of illuminating the first illumination zone by diffusion of the incident first coherent light beam,
the second diffusion region is capable of illuminating the second illumination zone that is at least partially different from the first illumination zone by diffusion of the incident second coherent light beam,
the first diffusion region includes a plurality of first element diffusion regions, the first element diffusion regions illuminating respective first partial regions in the first illumination zone by diffusion of the incident first coherent light beam, the first partial regions being respectively illuminated by the first element diffusion regions at least partially different from one another, and
the second diffusion region also includes a plurality of second element diffusion regions, the second element diffusion regions illuminating respective second partial regions in the second illumination zone by diffusion of the incident second coherent light beam, the second partial regions being respectively illuminated by the second element diffusion regions at least partially different from one another.

2. The illumination device according to claim 1, wherein the timing control unit individually controls the emission timing of the first coherent light beam and the second coherent light beam.

3. The illumination device according to claim 1, wherein the first diffusion region is capable of illuminating the first illumination zone conforming to a light distribution standard of a headlight by diffusion of the incident first coherent light beam, and
the second diffusion region is capable of illuminating the second illumination zone outside the light distribution standard by diffusion of the incident second coherent light beam.

4. The illumination device according to claim 1, further comprising a scanning unit that scans the optical device with the first coherent light beam and the second coherent light beam from the coherent light source.

5. The illumination device according to claim 4, wherein the scanning unit includes a light scanning device that periodically changes traveling directions of the first coherent light beam and the second coherent light beam emitted from the coherent light source.

6. The illumination device according to claim 5, wherein the timing control unit controls the incidence timing of the second coherent light beam on the optical device or the illumination timing of the second illumination zone in synchronization with timing of scan with the first coherent light beam and the second coherent light beam by the light scanning device, such that an illumination mode of the second illumination zone changes periodically or temporarily.

7. The illumination device according to claim 1, wherein the first diffusion region and the second diffusion region each have an elongated shape extending in a uniaxial direction and are disposed adjacent to each other in a direction orthogonal to the uniaxial direction.

8. The illumination device according to claim 1, further comprising an object detection unit that detects an object existing in the second illumination zone,
wherein the timing control unit controls the incidence timing of the second coherent light beam on the optical device or the illumination timing of the second illumination zone so as to illuminate the object detected by the object detection unit.

9. The illumination device according to claim 8, wherein the object detection unit comprises:
an imaging device that images the inside of the second illumination zone; and
an image processing unit that performs image processing on an imaging result of the imaging device to recognize the object in the second illumination zone.

10. The illumination device according to claim 8, wherein the object detection unit comprises:
a position information acquisition unit that acquires position information of a vehicle;
a storage unit that stores position information of an object; and
an information processing unit that recognizes the object in the second illumination zone based on the position information of the vehicle acquired by the position information acquisition unit and the position information of the object stored in the storage unit.

11. The illumination device according to claim 1, wherein the optical device is a hologram recording medium,
the first element diffusion regions of the first diffusion region are element hologram areas in which different interference fringe patterns are formed, and
the second element diffusion regions of the second diffusion region are element hologram areas in which different interference fringe patterns are formed.

12. The illumination device according to claim 1, wherein the optical device is a lens array group including a plurality of lens arrays,
the first element diffusion regions of the first diffusion region include lens arrays, and
the second element diffusion regions of the second diffusion region include lens arrays.

13. The illumination device according to claim 1, wherein the optical device is a lens array group including a plurality of lens arrays,
the first element diffusion regions of the first diffusion region include lens arrays, and
the second element diffusion regions of the second diffusion region include lens arrays.

14. A vehicle comprising the illumination device according to claim 1.

15. An illumination device comprising:
a coherent light source that emits a first coherent light beam and a second coherent light beam;
an optical device that diffuses the first coherent light beam to illuminate a first illumination zone and diffuses the second coherent light beam to illuminate a second illumination zone; and
a timing control unit comprising an optical shutter capable of switching between transmitting and blocking the first coherent light beam and the second coherent light beam or an optical path switching member capable of switching the optical paths of the first coherent light beam and the second coherent light beam, the timing control unit controlling incidence timing of the first coherent light beam and the second coherent light beam on the optical device or illumination timing of the first illumination zone and the second illumination zone by controlling switching timing of the optical shutter or the optical path switching member, wherein the optical device includes a first diffusion region on which the first coherent light beam is incident, and a second diffusion region on which the second coherent light beam is incident, the first diffusion region is capable of illuminating the first illumination zone by diffusion of the incident first coherent light beam, the second diffusion region is capable of illuminating the second illumination zone that is at least partially different from the first illumination zone by diffusion of the incident second coherent light beam, the first diffusion region includes a plurality of first element diffusion regions, the first element diffusion regions illuminating respective first partial regions in the first illumination zone by diffusion of the incident first coherent light beam, the first partial regions being respectively illuminated by the first element diffusion regions at least partially different from one another, and the second diffusion region also includes a plurality of second element diffusion regions, the second element diffusion regions illuminating respective second partial regions in the second illumination zone by diffusion of the incident second coherent light beam, the second partial regions being respectively illuminated by the second element diffusion regions at least partially different from one another.

16. The illumination device according to claim 15, wherein the first diffusion region is capable of illuminating the first illumination zone conforming to a light distribution standard of a headlight by diffusion of the incident first coherent light beam, and the second diffusion region is capable of illuminating the second illumination zone outside the light distribution standard by diffusion of the incident second coherent light beam.

17. The illumination device according to claim 15, further comprising a scanning unit that scans the optical device with the first coherent light beam and the second coherent light beam from the coherent light source.

18. The illumination device according to claim 15, wherein the first diffusion region and the second diffusion region each have an elongated shape extending in a uniaxial direction and are disposed adjacent to each other in a direction orthogonal to the uniaxial direction.

19. The illumination device according to claim 15, further comprising an object detection unit that detects an object existing in the second illumination zone, wherein the timing control unit controls the incidence timing of the second coherent light beam on the optical device or the illumination timing of the second illumination zone so as to illuminate the object detected by the object detection unit.

20. The illumination device according to claim 15, wherein the optical device is a hologram recording medium, the first element diffusion regions of the first diffusion region are element hologram areas in which different interference fringe patterns are formed, and the second element diffusion regions of the second diffusion region are element hologram areas in which different interference fringe patterns are formed.

* * * * *